US011820462B2

(12) United States Patent
Liao et al.

(10) Patent No.: US 11,820,462 B2
(45) Date of Patent: Nov. 21, 2023

(54) BICYCLE REAR DERAILLEUR

(71) Applicant: TEKTRO TECHNOLOGY CORPORATION, Changhua County (TW)

(72) Inventors: Bo-Yi Liao, Changhua County (TW); Pei-Hsuan Hung, Changhua County (TW)

(73) Assignee: TEKTRO TECHNOLOGY CORPORATION, Changhua County (TW)

(*) Notice: Subject to any disclaimer, the term of this patent is extended or adjusted under 35 U.S.C. 154(b) by 0 days.

(21) Appl. No.: 17/945,909

(22) Filed: Sep. 15, 2022

(65) Prior Publication Data

US 2023/0102982 A1  Mar. 30, 2023

(30) Foreign Application Priority Data

Sep. 27, 2021 (TW) ................................. 110135872

(51) Int. Cl.
*B62M 9/124* (2010.01)
*B62M 9/125* (2010.01)
*B62M 9/126* (2010.01)

(52) U.S. Cl.
CPC ............ *B62M 9/124* (2013.01); *B62M 9/125* (2013.01); *B62M 9/126* (2013.01)

(58) Field of Classification Search
CPC .... B62M 9/121; B62M 9/124; B62M 9/1242; B62M 9/1244; B62M 9/125; B62M 9/126; B62M 2009/12406
See application file for complete search history.

(56) References Cited

U.S. PATENT DOCUMENTS

| 4,690,663 | A | * | 9/1987 | Nagano | B62M 9/125 |
| | | | | | 474/80 |
| 5,498,211 | A | * | 3/1996 | Hsu | B62M 9/1248 |
| | | | | | 74/473.13 |
| 5,931,753 | A | * | 8/1999 | Ichida | B62M 9/1244 |
| | | | | | 474/82 |
| 7,396,304 | B2 | * | 7/2008 | Shahana | B62M 9/125 |
| | | | | | 474/82 |
| 7,585,237 | B2 | * | 9/2009 | Fukuda | B62M 9/125 |
| | | | | | 411/383 |
| 7,614,972 | B2 | * | 11/2009 | Oseto | B62M 9/1244 |
| | | | | | 474/82 |

(Continued)

*Primary Examiner* — Michael R Mansen
*Assistant Examiner* — Raveen J Dias
(74) *Attorney, Agent, or Firm* — Maschoff Brennan

(57) ABSTRACT

A bicycle rear derailleur is configured to be mounted on a wheel shaft on a bicycle frame. The bicycle rear derailleur includes a base component, a movable component, a linkage assembly, a chain guide, and a mount assembly. The base component is configured to be mounted on the bicycle frame. Two opposite ends of the linkage assembly are pivotally disposed on the base component and the movable component respectively. The chain guide is pivotally disposed on the movable component. The mount assembly includes an adapter, a bushing, and a fastener. The adapter is configured to be fixed on the bicycle frame. The base component is stacked on the adapter. The bushing is configured to be disposed through the bicycle frame, the adapter and the base component and is configured for an insertion of the wheel shaft. The fastener is fastened on the bushing.

18 Claims, 16 Drawing Sheets

(56) References Cited

U.S. PATENT DOCUMENTS

| | | | | |
|---|---|---|---|---|
| 7,703,785 B2* | 4/2010 | Colegrove | B62K 25/286 | 474/122 |
| 9,227,465 B2* | 1/2016 | Nakajima | B60B 27/026 | |
| 10,870,464 B2* | 12/2020 | Braedt | B62M 9/1242 | |
| 10,981,626 B2* | 4/2021 | Braedt | B62M 9/12 | |
| 11,230,350 B2* | 1/2022 | Braedt | B62M 9/125 | |
| 2004/0110586 A1* | 6/2004 | Shahana | B62J 23/00 | 474/80 |
| 2004/0110587 A1* | 6/2004 | Shahana | B62J 23/00 | 474/82 |
| 2004/0254038 A1* | 12/2004 | Chamberlain | B62M 9/128 | 474/82 |
| 2006/0058135 A1* | 3/2006 | Shahana | B62M 9/125 | 474/82 |
| 2006/0105869 A1* | 5/2006 | Fukuda | B62M 9/125 | 474/82 |
| 2006/0194660 A1* | 8/2006 | Shahana | B62M 9/12 | 474/82 |
| 2007/0026985 A1* | 2/2007 | Yamaguchi | B62M 9/126 | 474/82 |
| 2008/0051237 A1* | 2/2008 | Shahana | B62M 9/1244 | 474/82 |
| 2008/0064544 A1* | 3/2008 | Yamaguchi | B62M 9/125 | 474/82 |
| 2009/0045601 A1* | 2/2009 | Colegrove | B62M 9/125 | 280/284 |
| 2009/0275429 A1* | 11/2009 | Deguchi | B62M 9/125 | 474/80 |
| 2010/0004079 A1* | 1/2010 | Watarai | B62M 9/125 | 474/135 |
| 2010/0160099 A1* | 6/2010 | Colegrove | B62M 9/125 | 474/122 |
| 2013/0241175 A1* | 9/2013 | Talavasek | B62M 6/60 | 280/288.4 |
| 2014/0018199 A1* | 1/2014 | Shahana | B62M 9/126 | 474/82 |
| 2014/0306512 A1* | 10/2014 | Nakajima | B60B 35/004 | 301/132 |
| 2018/0050758 A1* | 2/2018 | Pfeiffer | B62K 3/10 | |
| 2018/0265169 A1* | 9/2018 | Braedt | B62M 9/126 | |
| 2019/0016411 A1* | 1/2019 | Ueda | B62M 25/02 | |
| 2019/0291818 A1* | 9/2019 | Braedt | B62M 9/12 | |
| 2019/0322333 A1* | 10/2019 | Braedt | B62M 9/125 | |
| 2020/0062343 A1* | 2/2020 | Braedt | B62M 9/125 | |
| 2020/0198728 A1* | 6/2020 | Braedt | B62M 9/125 | |
| 2020/0255090 A1* | 8/2020 | Chiang | B62M 9/125 | |
| 2020/0298933 A1* | 9/2020 | Braedt | B62M 9/1242 | |
| 2020/0339220 A1* | 10/2020 | Boehm | B62M 9/1242 | |
| 2021/0070395 A1* | 3/2021 | Braedt | B62M 9/125 | |
| 2021/0188396 A1* | 6/2021 | Braedt | B62K 25/02 | |
| 2021/0339822 A1* | 11/2021 | Roman | B62K 25/286 | |
| 2021/0371047 A1* | 12/2021 | Tsai | B62M 9/125 | |
| 2022/0063761 A1* | 3/2022 | Heyna | B62M 9/04 | |
| 2022/0177075 A1* | 6/2022 | Braedt | B62M 9/125 | |
| 2022/0204134 A1* | 6/2022 | Shahana | B62M 9/125 | |
| 2022/0204135 A1* | 6/2022 | Shahana | B62M 9/125 | |
| 2022/0363339 A1* | 11/2022 | Braedt | B62K 25/02 | |
| 2022/0411017 A1* | 12/2022 | Braedt | B62M 9/16 | |
| 2023/0166812 A1* | 6/2023 | Fujita | B62M 9/125 | 403/343 |
| 2023/0166813 A1* | 6/2023 | Fujita | B62M 9/125 | 403/343 |
| 2023/0166814 A1* | 6/2023 | Fujita | B62K 25/02 | 280/276 |
| 2023/0182860 A1* | 6/2023 | Chen | B62M 9/124 | 474/80 |

* cited by examiner

BICYCLE REAR DERAILLEUR

CROSS-REFERENCE TO RELATED APPLICATIONS

This non-provisional application claims priority under 35 U.S.C. § 119(a) on Patent Application No(s). 110135872 filed in Taiwan, R.O.C. on Sep. 27, 2021, the entire contents of which are hereby incorporated by reference.

TECHNICAL FIELD

The disclosure relates to a rear derailleur, more particularly to a bicycle rear derailleur.

BACKGROUND

In recent years, road bikes, mountain bikes and other types of bicycles are all popular in the market, and it motivates bicycle manufacturers to pay more attention on improving their products.

The rear derailleur is generally disposed on the bicycle frame. In detail, the bicycle frame has a wheel shaft mount part and an extension part. The wheel shaft mount part is namely the part for mounting the wheel shaft. The extension part extends and protrudes from the wheel shaft mount part, and the extension part is configured for an installation of a bicycle rear derailleur; that is, the rear derailleur and the wheel shaft of the bicycle are not coaxially disposed on the bicycle frame, which causes the rear derailleur may be unstable when an impact or a shock is applied to the rear derailleur, thereby adversely affecting the rear derailleur. Therefore, how to solve the aforementioned issue is one of the crucial topics in this field.

SUMMARY

The disclosure provides a bicycle rear derailleur which is effectively maintained stable when an impact or a shock is applied thereon.

One embodiment of the disclosure provides a bicycle rear derailleur configured to be mounted on a wheel shaft on a bicycle frame. The bicycle rear derailleur includes a base component, a movable component, a linkage assembly, a chain guide, and a mount assembly. The base component is configured to be mounted on the bicycle frame. Two opposite ends of the linkage assembly are pivotally disposed on the base component and the movable component respectively. The chain guide is pivotally disposed on the movable component. The mount assembly includes an adapter, a bushing, and a fastener. The adapter is configured to be fixed on the bicycle frame. The base component is stacked on the adapter. The bushing is configured to be disposed through the bicycle frame, the adapter and the base component and is configured for an insertion of the wheel shaft. The fastener is fastened on the bushing.

Another embodiment of the disclosure provides a bicycle rear derailleur configured to be mounted on a wheel shaft on a bicycle frame. The bicycle rear derailleur includes a base component, a movable component, a linkage assembly, a chain guide, and a mount assembly. The base component is configured to be mounted on the bicycle frame. Two opposite ends of the linkage assembly are pivotally disposed on the base component and the movable component respectively. The chain guide is pivotally disposed on the movable component. The mount assembly includes an adapter and a fastener. The adapter is configured to be fixed on the bicycle frame and partially clamped between the bicycle frame and the base component. The bicycle frame, the base component and the adapter which is clamped between the bicycle frame and the base component are configured for a penetration of the wheel shaft. The fastener is configured to be fastened on the wheel shaft and in contact with the base component.

According to the bicycle rear derailleur as described above, the bushing is configured to be disposed through the bicycle frame, the adapter and the base component and is configured for the insertion of the wheel shaft, and the fastener is fastened on the bushing. Alternatively, the bicycle frame, the base component and the adapter which is clamped between the bicycle frame and the base component are configured for a penetration of the wheel shaft, and the fastener is fastened on the wheel shaft and contacts the base component. Accordingly, the bicycle rear derailleur and the wheel shaft are coaxially disposed on the bicycle frame. Therefore, the stability of the bicycle rear derailleur can be improved so as to enable the bicycle rear derailleur to resist an impact or a shock.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
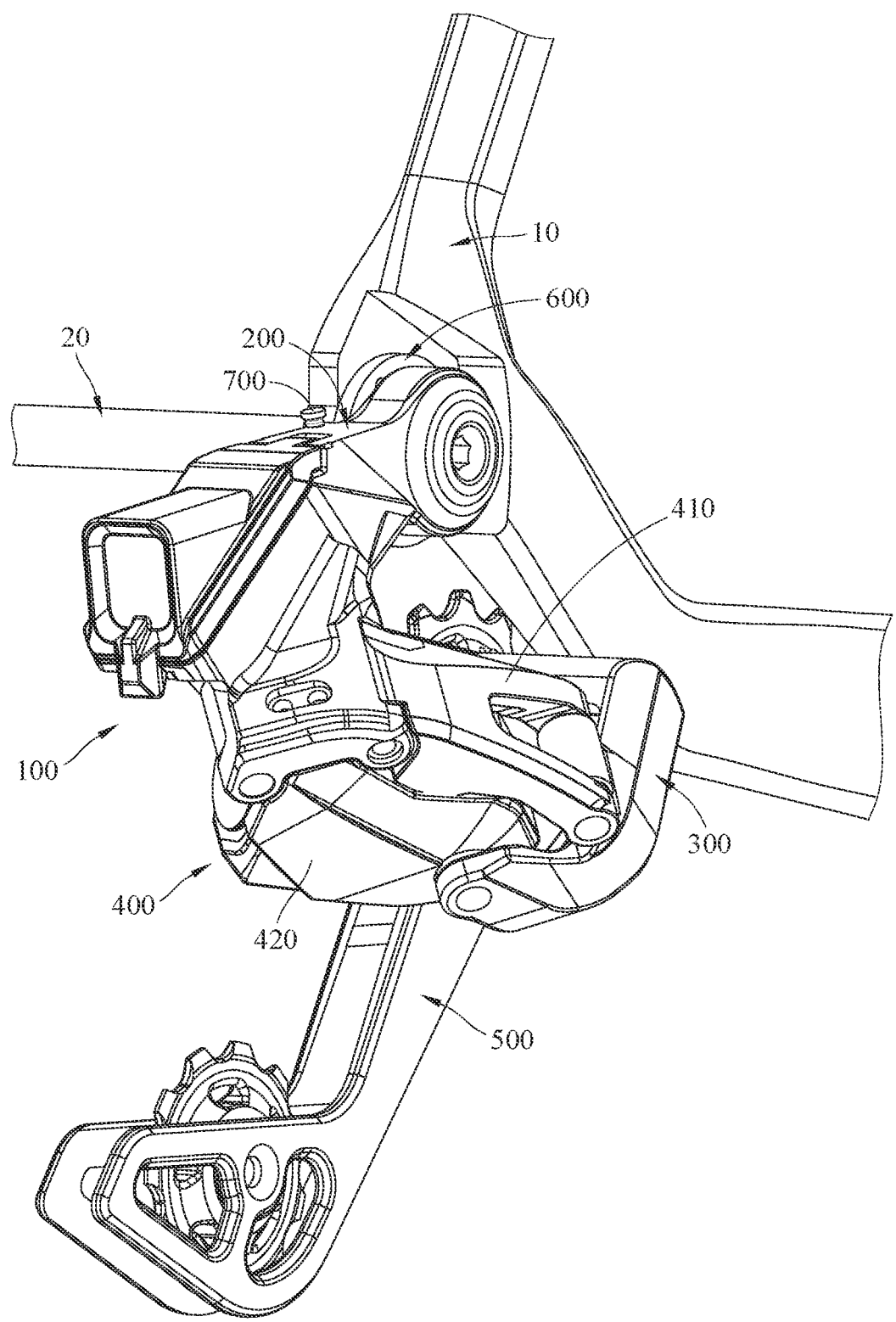
FIG. 1 is a perspective view of a bicycle rear derailleur in accordance with the first embodiment of the disclosure, a bicycle frame, and a wheel shaft.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
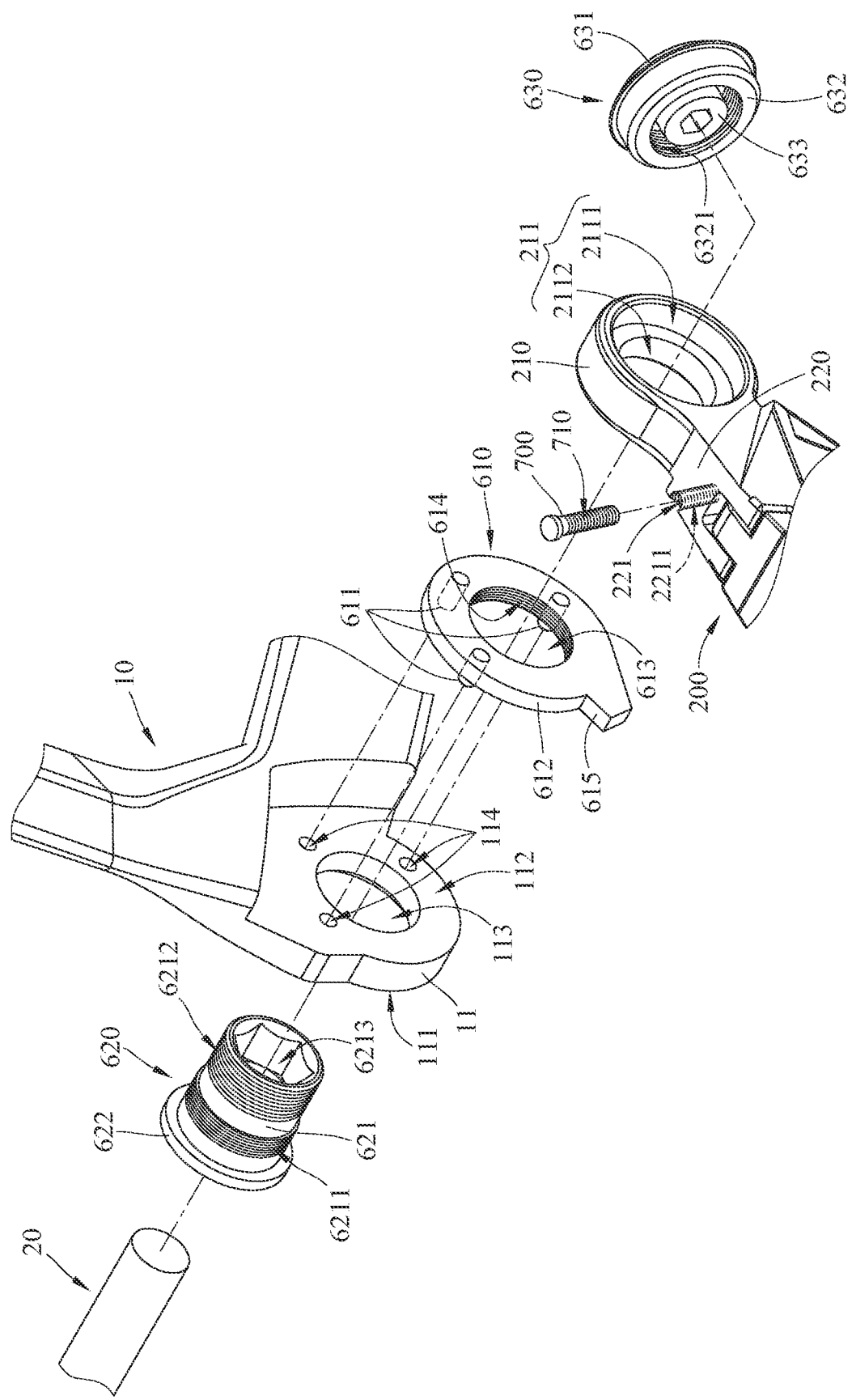
FIG. 2 is a partially exploded view of the bicycle rear derailleur, the bicycle frame and the wheel shaft in FIG. 1.
Figure 3:
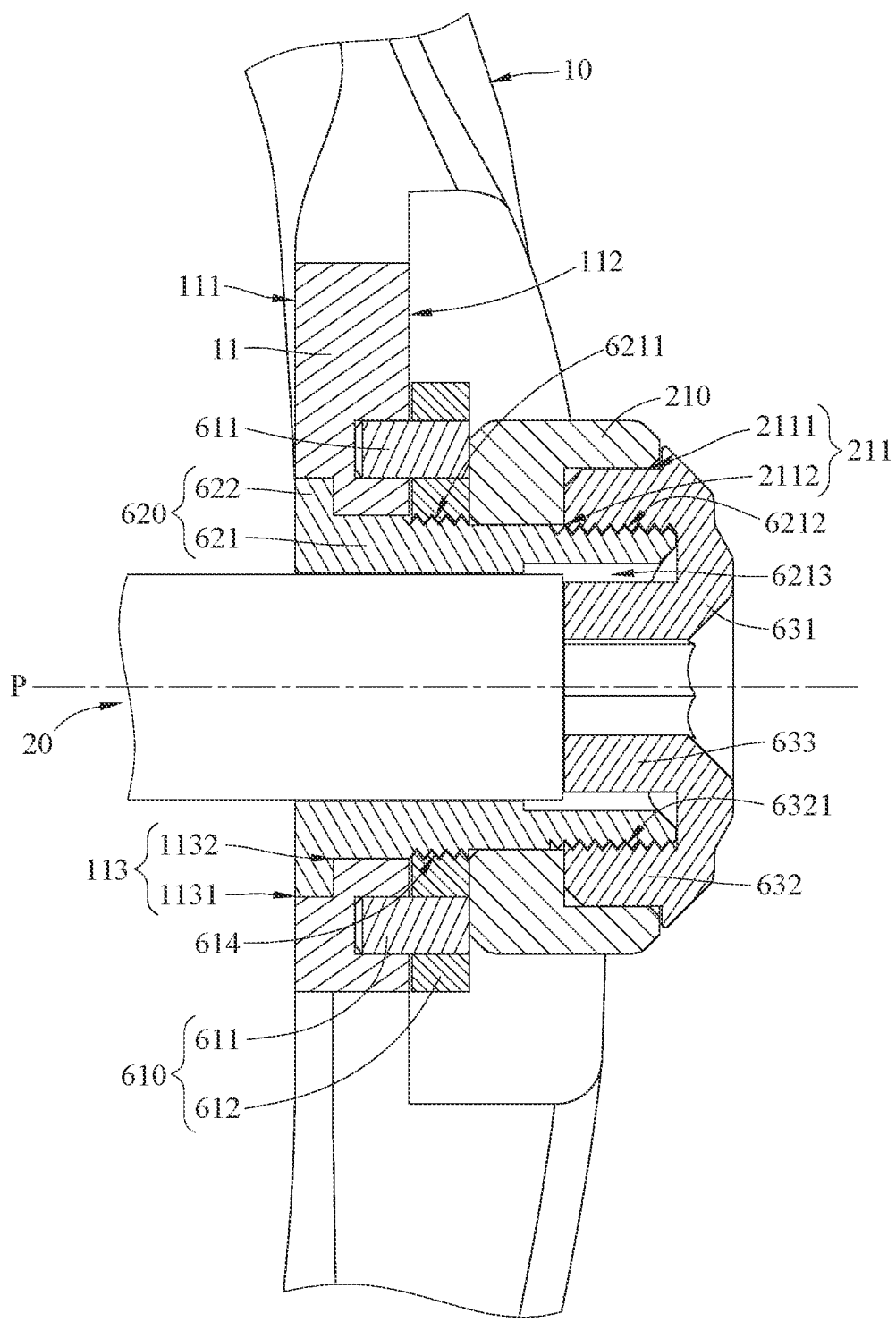
FIG. 3 is a partially cross-sectional view of the bicycle rear derailleur, the bicycle frame and the wheel shaft in FIG. 1.
Figure 4:
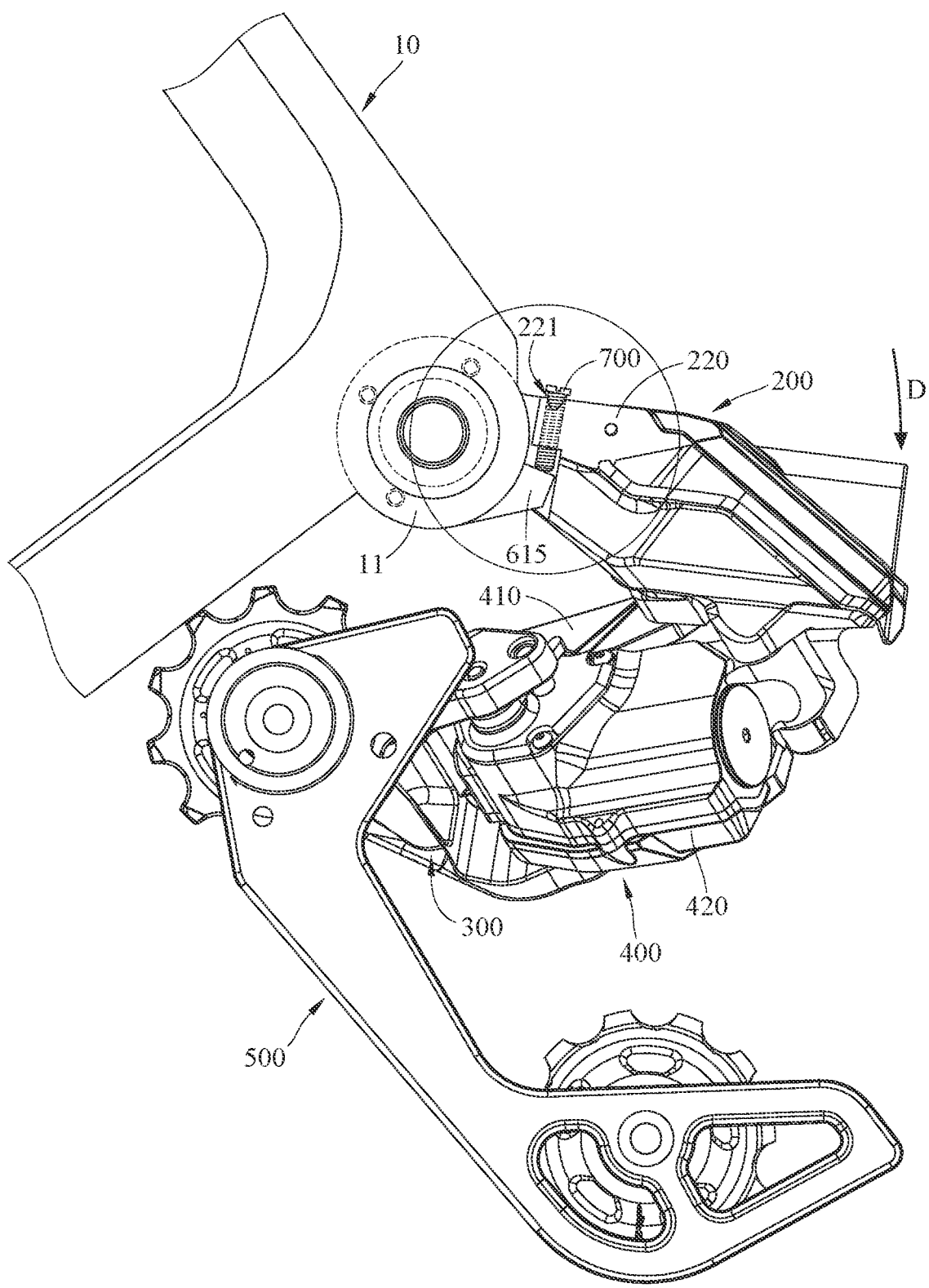
FIG. 4 is a side view of the bicycle rear derailleur, the bicycle frame and the wheel shaft in FIG. 1.
Figure 5:
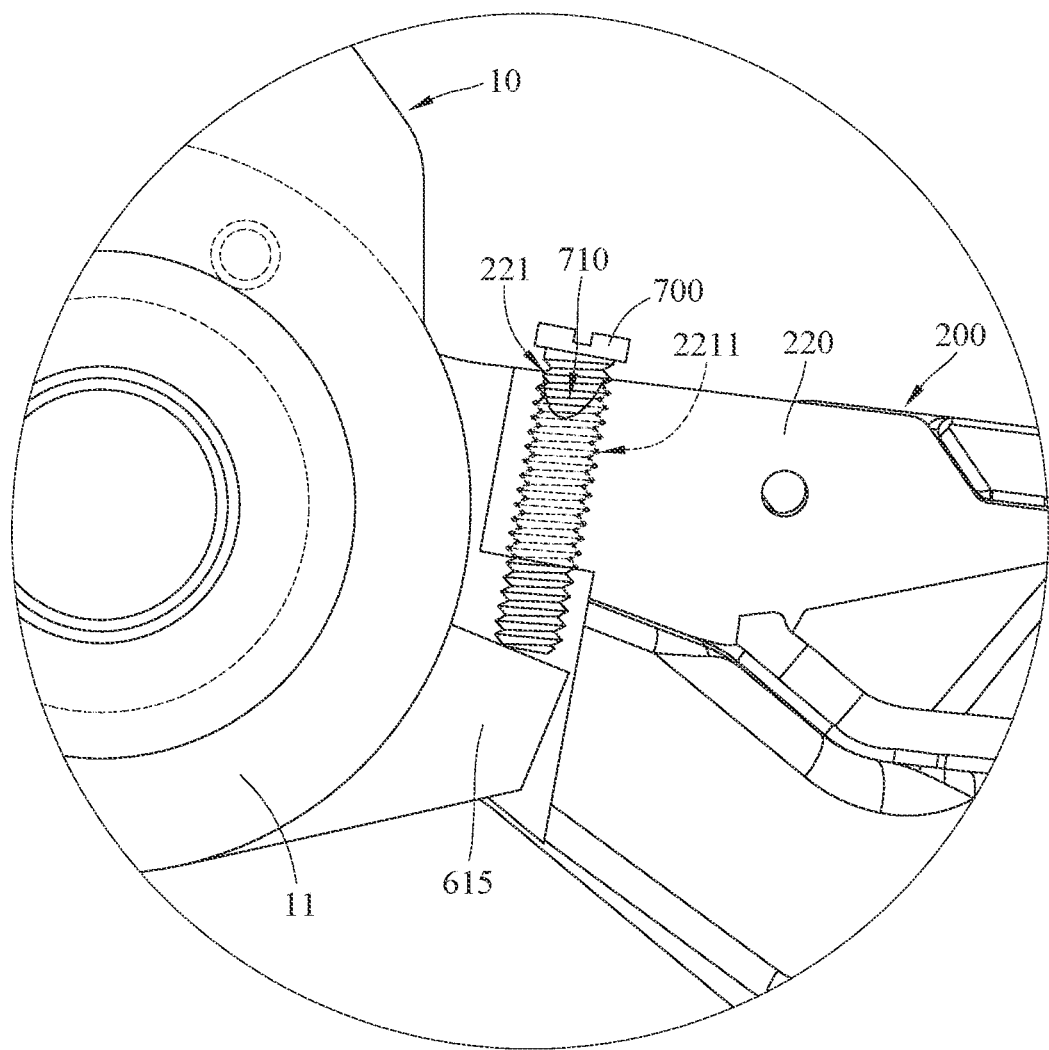
FIG. 5 is a partially enlarged side view of the bicycle rear derailleur, the bicycle frame and the wheel shaft in FIG. 4.

Refer to FIG. 1 to FIG. 5, where FIG. 1 is a perspective view of a bicycle rear derailleur 100 in accordance with the first embodiment of the disclosure, a bicycle frame 10, and a wheel shaft 20, FIG. 2 is a partially exploded view of the bicycle rear derailleur 100, the bicycle frame 10 and the wheel shaft 20 in FIG. 1, FIG. 3 is a partially cross-sectional view of the bicycle rear derailleur 100, the bicycle frame 10 and the wheel shaft 20 in FIG. 1, FIG. 4 is a side view of the bicycle rear derailleur 100, the bicycle frame 10 and the wheel shaft 20 in FIG. 1, and FIG. 5 is a partially enlarged side view of the bicycle rear derailleur 100, the bicycle frame 10 and the wheel shaft 20 in FIG. 4.

In this embodiment, the bicycle rear derailleur 100 is mounted on the wheel shaft 20 on the bicycle frame 10. The bicycle frame 10 has a mount portion 11. The mount portion 11 has an inner surface 111, an outer surface 112, a through hole 113, and a plurality of positioning recesses 114 located aside the through hole 113. The inner surface 111 of the mount portion 11 is configured to face a rear cassette assembly (not shown). The outer surface 112 faces away from the inner surface 111. The through hole 113 extends from the outer surface 112 to the inner surface 111. The positioning recesses 114 are formed at the outer surface 112. The through hole 113 and the positioning recesses 114 are configured for the installation of the bicycle rear derailleur 100, and the later paragraphs will introduce them in detail.

The bicycle rear derailleur 100 includes a base component 200, a movable component 300, a linkage assembly 400, a chain guide 500 and a mount assembly 600.

The linkage assembly 400 includes a first link 410 and a second link 420. Two opposite ends of the first link 410 are pivotally disposed on the base component 200 and the movable component 300 respectively, and two opposite ends of the second link 420 are pivotally disposed on the base component 200 and the movable component 300 respectively. The base component 200, the movable component 300, the first link 410, and the second link 420 together form a four-link mechanism. The chain guide 500 is pivotally disposed on the movable component 300. The four-link mechanism is configured to move the chain guide 500 relative to the bicycle frame 10 so that a bicycle chain (not shown) can be moved among sprockets of the rear cassette assembly which are different in size.

The mount assembly 600 includes an adapter 610, a bushing 620, and a fastener 630. The adapter 610 is configured to be fixed on the bicycle frame 10. The base component 200 is stacked on the adapter 610. The bushing 620 is configured to be disposed through the bicycle frame 10, the adapter 610 and the base component 200, and the bushing 620 is configured for an insertion of the wheel shaft 20. The fastener 630 is fastened on the bushing 620. The following paragraphs will further introduce the connections among the bicycle frame 10, the adapter 610, the bushing 620, the fastener 630 of the mount assembly 600 and the base component 200 in detail.

The adapter 610 has a plurality of positioning protrusions 611 and a plate portion 612. The plate portion 612 has a through hole 613 and an inner threaded structure 614. The positioning protrusions 611 protrude from the plate portion 612 and extend in a direction parallel to an axis P of the bushing 620. The plate portion 612 is configured to be stacked on the outer surface 112 of the mount portion 11 of the bicycle frame 10. The plurality of positioning protrusions 611 are configured to be inserted into the positioning recesses 114 of the bicycle frame 10 so that the adapter 610 is unable to rotate relative to the bicycle frame 10. The inner threaded structure 614 of the plate portion 612 is located in the through hole 613.

Note that the quantities of the positioning protrusions 611 of the adapter 610 and the positioning recesses 114 of the bicycle frame 10 are not restricted in the disclosure and may be modified to be one in some other embodiments.

In this embodiment, the through hole 113 of the bicycle frame 10 has a wide portion 1131 and a narrow portion 1132. An inner diameter of the wide portion 1131 is larger than that of the narrow portion 1132, and the wide portion 1131 is located closer to the inner surface 111 of the bicycle frame 10 than the narrow portion 1132. The bushing 620 has a pillar portion 621 and a flange portion 622 radially protruding from the pillar portion 621. The pillar portion 621 has two outer threaded structures 6211 and 6212 separated from each other, and the outer threaded structure 6211 is located between the flange portion 622 and the outer threaded structure 6212. The pillar portion 621 of the bushing 620 is disposed through the narrow portion 1132 and the wide portion 1131 of the through hole 113 of the bicycle frame 10. The flange portion 622 of the bushing 620 is located at the wide portion 1131 of the through hole 113 of the bicycle frame 10. The pillar portion 621 of the bushing 620 is disposed through the through hole 613 of the plate portion 612 of the adapter 610, and the outer threaded structure 6211 of the pillar portion 621 of the bushing 620 is screwed with inner threaded structure 614 in the through hole 613 of the plate portion 612 of the adapter 610, such that the adapter 610 is fixed to the bushing 620. As shown in FIG. 3, a portion of the mount portion 11 of the bicycle frame 10 forming the narrow portion 1132 of the through hole 113 is located between the flange portion 622 of the bushing 620 and the plate portion 612 of the adapter 610.

Note that the through hole 113 of the bicycle frame 10 is not restricted to having the wide portion 1131 and the narrow portion 1132. In some other embodiments, the through hole 113 of the bicycle frame 10 may have an uniform inner diameter, and the flange portion 622 of the bushing 620 may directly contact the inner surface 111 of the mount portion 11 of the bicycle frame 10.

In this embodiment, the base component 200 has a mount portion 210 and a seat 220 connected to the mount portion 210. The mount portion 210 has a through hole 211. The through hole 211 has a wide portion 2111 and a narrow portion 2112. An inner diameter of the wide portion 2111 is larger than that of the narrow portion 2112. The pillar portion 621 of the bushing 620 is disposed through the wide portion 2111 and the narrow portion 2112 of the through hole 211 of the mount portion 210 of the base component 200. The mount portion 210 of the base component 200 is stacked on a surface of the plate portion 612 of the adapter 610 facing away from the mount portion 11 of the bicycle frame 10, such that a portion of the mount portion 11 of the bicycle frame 10 forming the narrow portion 1132 of the through hole 113 and the adapter 610 are located between the flange portion 622 of the bushing 620 and the mount portion 210 of the base component 200. The narrow portion 2112 of the through hole 211 of the mount portion 210 of the base component 200 is located closer to the adapter 610 than the wide portion 2111, and the outer threaded structure 6212 of the pillar portion 621 of the bushing 620 is located in the wide portion 2111 of the through hole 211.

In this embodiment, the pillar portion 621 of the bushing 620 further has a through hole 6213. The through hole 6213 is configured for an insertion of the wheel shaft 20. The fastener 630 includes a cap portion 631, a first annular portion 632 and a second annular portion 633. The first annular portion 632 and the second annular portion 633 both protrude from the same side of the cap portion 631, and the first annular portion 632 surrounds the second annular portion 633. The first annular portion 632 has an inner threaded structure 6321 located at a surface of the first annular portion 632 facing the second annular portion 633. The first annular portion 632 is disposed in the wide portion 2111 of the through hole 211 of the mount portion 210 of the base component 200. The inner threaded structure 6321 of the first annular portion 632 is screwed with the outer threaded structure 6212 of the bushing 620. The second annular portion 633 is inserted into the through hole 6213 of the pillar portion 621 of the bushing 620. The cap portion 631 contacts a side of the mount portion 210 of the base component 200 located opposite to the plate portion 612 of the adapter 610. Accordingly, the plate portion 612 of the adapter 610 and the mount portion 210 of the base component 200 are clamped between the mount portion 11 of bicycle frame 10 and the cap portion 631 of the fastener 630.

Note that the pillar portion 621 of the bushing 620 and the adapter 610 are not restricted to being assembled with each other via threaded structures. In some other embodiments, the pillar portion 621 of the bushing 620 may not have the outer threaded structure 6211, and the through hole 613 of the adapter 610 may not have the inner threaded structure 614. The pillar portion 621 of the bushing 620 may be merely disposed through the through hole 613 of the adapter 610. The adapter 610 may be directly fixed on the bicycle frame 10 by being clamped between the mount portion 11 of the bicycle frame 10 and the mount portion 210 of the base component 200. Furthermore, in another embodiment, the mount portion 11 of the bicycle frame 10 may not have any positioning recess, and the adapter 610 may not have any positioning protrusion. In such a configuration, the bushing 620, the mount portion 11 of the bicycle frame 10, the adapter 610, the mount portion 210 of the base component 200 and the fastener 630 may be tightly contact one another for fixing the adapter 610 on the bicycle frame 10 and making the adapter 610 not rotatable relative to the bicycle frame 10.

In this embodiment, the bushing 620 is configured to be disposed through the bicycle frame 10, the adapter 610 and the base component 200 and is configured for the insertion of the wheel shaft 20, and the fastener 630 is fastened on the bushing 620, such that the bicycle rear derailleur 100 and the wheel shaft 20 are coaxially disposed on the bicycle frame 10. Therefore, the stability of the bicycle rear derailleur 100 can be improved so as to enable the bicycle rear derailleur 100 to resist an impact or a shock.

In addition, the bushing 620 configured for the insertion of the wheel shaft 20 is disposed through the bicycle frame 10, the adapter 610 and the base component 200, and the plate portion 612 of the adapter 610, the mount portion 210 of the base component 200 and the fastener 630 are located at a side of the mount portion 11 where the outer surface 112 faces, which facilitates the space located at an inner side of the bicycle frame 10 (e.g., the side of the mount portion 11 where the outer surface 112 faces) to be utilized for accommodating other components (e.g., the rear cassette assembly). Furthermore, with the aforementioned configuration, the bicycle rear derailleur 100 can be dissembled from the bicycle frame 10 after the faster 630 is removed from the bushing 620. Therefore, during the removal of the bicycle rear derailleur 100 from the bicycle frame 10, there is no need to remove the wheel shaft 20 from the bicycle frame 10, such that it is convenient to remove the bicycle rear derailleur 100. Similarly, the aforementioned configuration also facilitates the installation of the bicycle rear derailleur 100.

In this embodiment, the base component 200 is pivotable relative to the adapter 610 via the bushing 620. The bicycle rear derailleur 100 further includes an adjustment component 700, and the plate portion 612 of the adapter 610 has a contact protrusion 615. The adjustment component 700 is rotatably disposed through the seat 220 of the base component 200 and contacts the contact protrusion 615 of the plate portion 612 of the adapter 610. In detail, the seat 220 of the base component 200 has a screw hole 221. The screw hole 221 has an inner threaded structure 2211. The adjustment component 700 has an outer threaded structure 710. The outer threaded structure 710 of the adjustment component 700 is screwed with the inner threaded structure 2211 of the screw hole 221, and a side of the adjustment component 700 protrudes from the screw hole 221 and contact the contact protrusion 615 of the plate portion 612 of the adapter 610.

When the bicycle rear derailleur 100 is mounted on the bicycle frame 10 and the bicycle chain is hung on the chain guide 500, the tension of the bicycle chain may exert on the entire bicycle rear derailleur 100 along a pivoting direction D, and forces an end of the adjustment component 700 to keep contacting the contact protrusion 615 of the plate portion 612 of the adapter 610.

Figure 6:
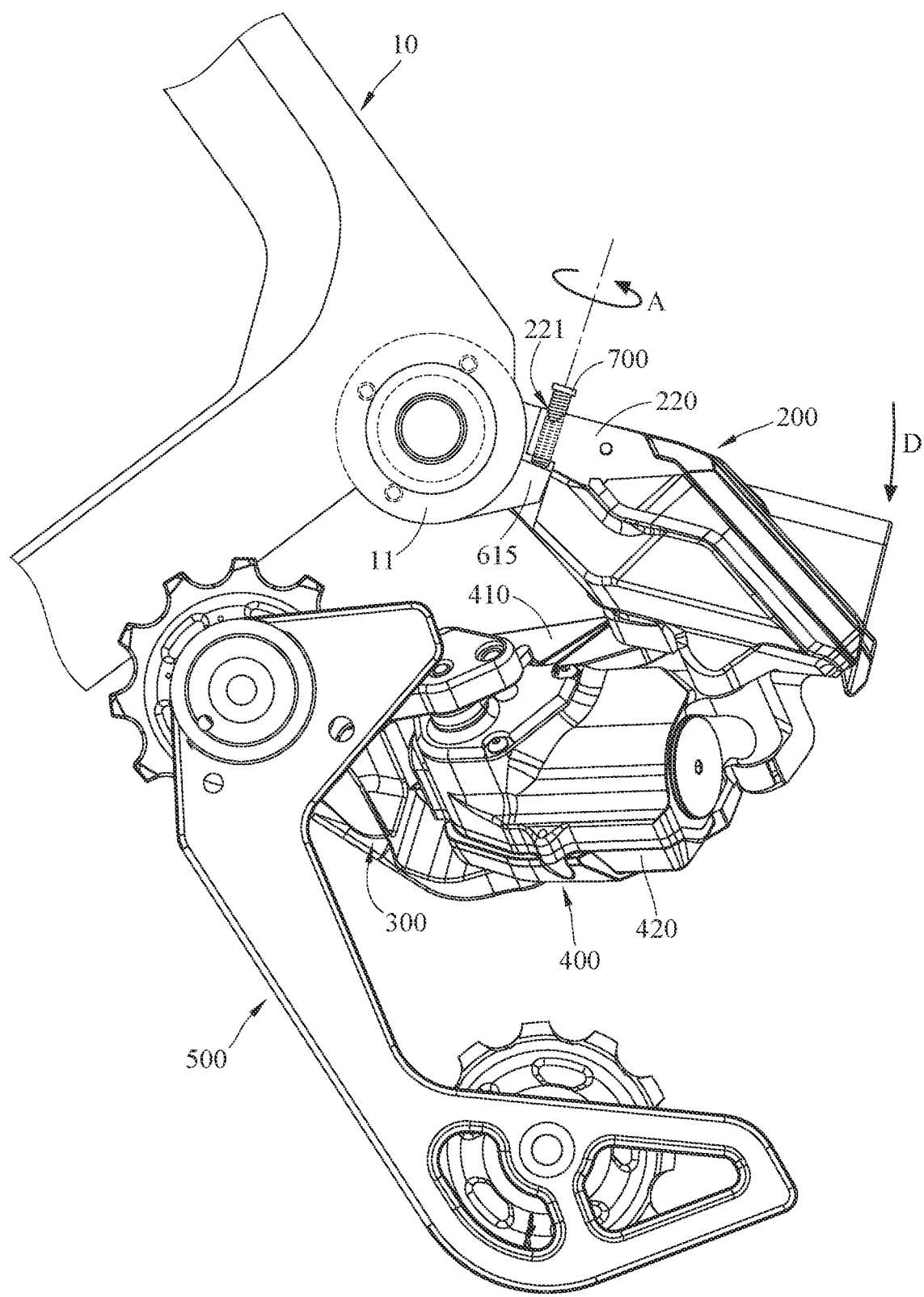
FIG. 6 is a side view of the bicycle rear derailleur, the bicycle frame and the wheel shaft in FIG. 4 when a position of the bicycle rear derailleur relative to the bicycle frame is adjusted.

In this embodiment, the adjustment component 700 can be rotated relative to the base component 200 for driving the base component 200 to pivot relative to the adapter 610. In detail, refer to FIG. 6, where FIG. 6 is a side view of the bicycle rear derailleur 100, the bicycle frame 10 and the wheel shaft 20 in FIG. 4 when a position of the bicycle rear derailleur 100 relative to the bicycle frame 10 is adjusted. Since the adapter 610 is fixed on the mount portion 11 of the bicycle frame 10, and an end of the adjustment component 700 keeps contacting the contact protrusion 615 of the plate portion 612 of the adapter 610, rotating the adjustment component 700 along a direction A enables the base component 200 to pivot in the direction D via the cooperation of the inner threaded structure 2211 of the screw hole 221 of the base component 200 and the outer threaded structure 710 of the adjustment component 700, and shortens the length of the adjustment component 700 sticking out of the screw hole 221 of the base component 200. By doing so, the movable component 300, the linkage assembly 400 and the chain guide 500 can be pivoted along with the base component 200 in the direction D so as to adjust the positions of these components relative to the bicycle frame 10.

Similarly, rotating the adjustment component 700 in a direction opposite to the direction A may cause the base component 200, the movable component 300, the linkage assembly 400 and the chain guide 500 to pivot together in a direction opposite to the direction D so as to adjust the positions of these components relative to bicycle frame 10.

A bicycle rear derailleur of the second embodiment will be described hereinafter. The bicycle rear derailleur of the second embodiment is similar to the bicycle rear derailleur 100 with reference to FIG. 1 to FIG. 6. The main difference between the bicycle rear derailleur of the second embodiment and the bicycle rear derailleur 100 with reference to FIG. 1 to FIG. 6 is that the structure of the adapter fixed on the bicycle frame. Therefore, the following embodiment mainly introduces the structure of the adapter fixed on the bicycle frame, and structures of other components and relative positions and connections among these components can refer to the above paragraphs corresponding to the bicycle rear derailleur 100 with reference to FIG. 1 to FIG. 6, and thus will not be repeatedly introduced.

Figure 7:
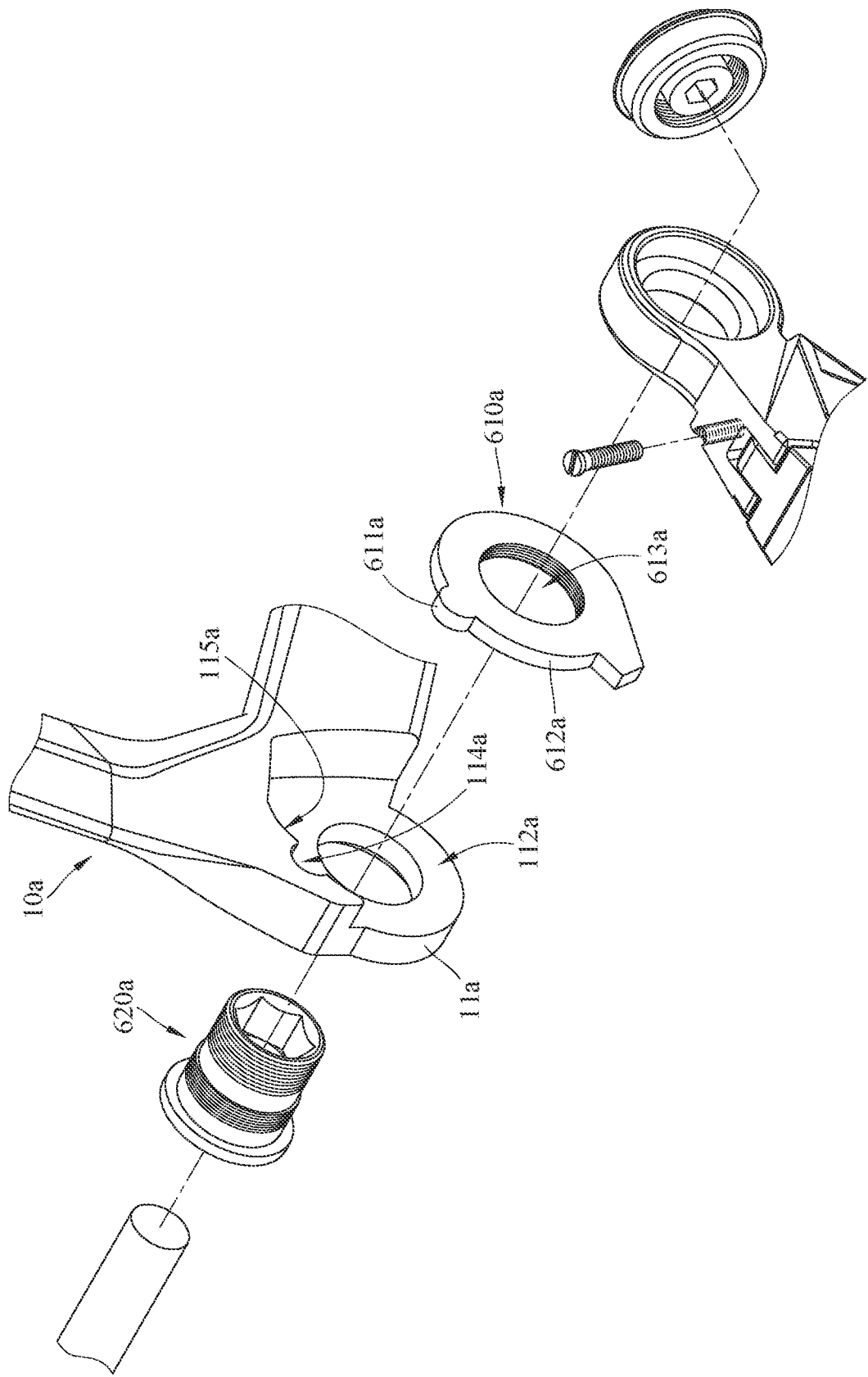
FIG. 7 is a partially exploded view of a bicycle rear derailleur in accordance with the second embodiment of the disclosure, a bicycle frame, and a wheel shaft.
Figure 8:
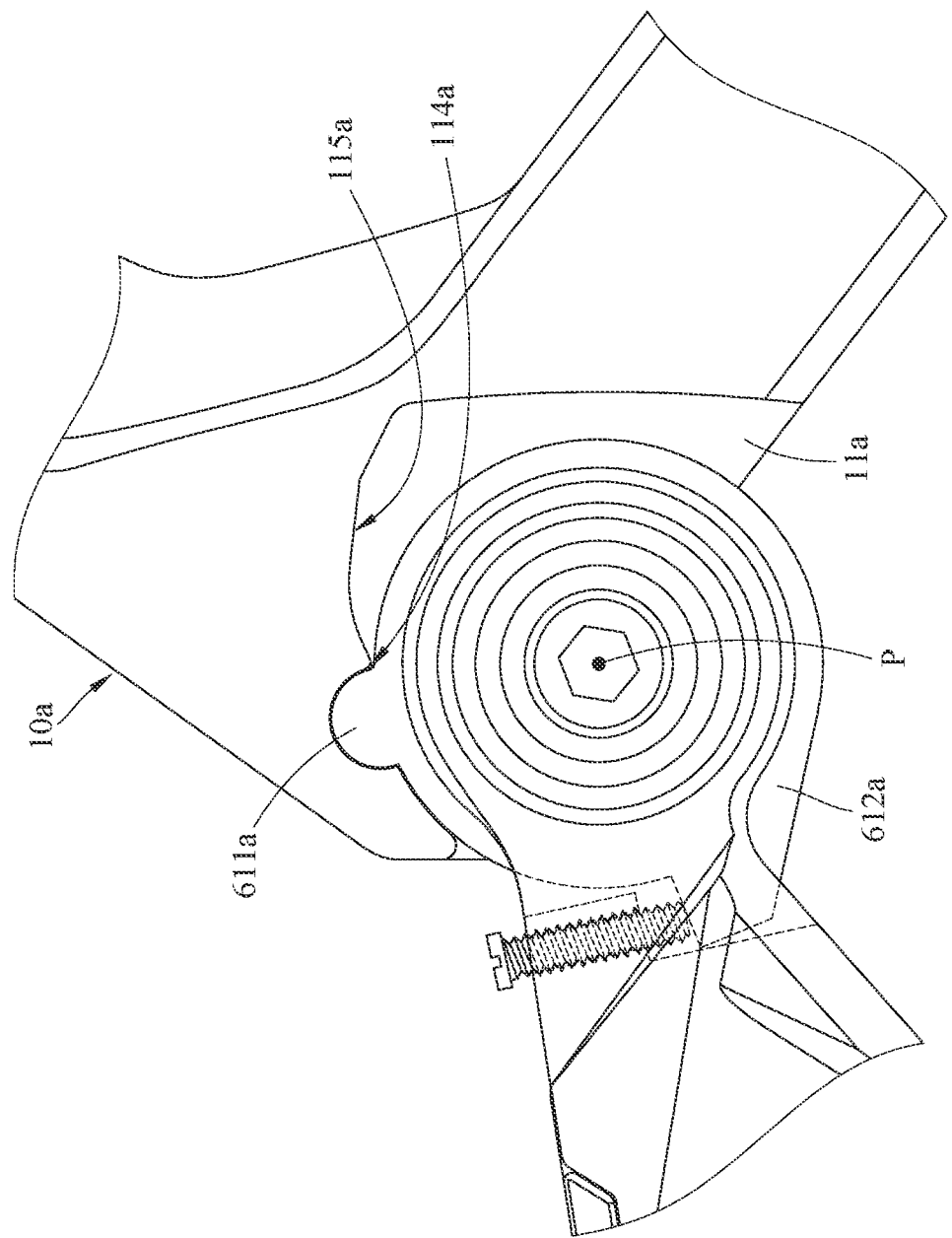
FIG. 8 is a side view of the bicycle rear derailleur, the bicycle frame and the wheel shaft in FIG. 7.

Referring to FIG. 7 and FIG. 8, where FIG. 7 is a partially exploded view of a bicycle rear derailleur in accordance with the second embodiment of the disclosure, a bicycle frame, and a wheel shaft, and FIG. 8 is a side view of the bicycle rear derailleur, the bicycle frame and the wheel shaft in FIG. 7.

In this embodiment, a mount portion 11a of a bicycle frame 10a has a surface 115a. The surface 115a is connected to an outer surface 112a of the mount portion 11a, and the surface 115a is, for example, perpendicular to the outer surface 112a of the mount portion 11a. The quantity of a positioning recess 114a of the mount portion 11a of the bicycle frame 10a is one, and the positioning recesses 114a is formed at the surface 115a. The quantity of a positioning protrusion 611a of an adapter 610a is one. The positioning protrusion 611a of the adapter 610a protrudes from a surface of a plate portion 612a of the adapter 610a facing away from a through hole 613a, and the positioning protrusion 611a extends in a direction perpendicular to an axis P of a bushing 620a. The positioning protrusion 611a is configured to be engaged with the positioning recess 114a of the bicycle frame 10a. In this way, after the positioning protrusion 611a is engaged with the positioning recess 114a of the bicycle frame 10a, the cooperation of the positioning protrusion 611a and the positioning recess 114a can prevent the adapter 610a from being rotated, and the adapter 610a is fixed on the bicycle frame 10a.

Bicycle rear derailleurs of the third and the fourth embodiment will be described hereinafter. The bicycle rear derailleur of the third and the fourth embodiment is similar to the bicycle rear derailleur 100 with reference to FIG. 1 to FIG. 6. The main difference between the bicycle rear derailleurs of the third and the fourth embodiment and the bicycle rear derailleur 100 with reference to FIG. 1 to FIG. 6 is that the adapter is not directly engaged with the bicycle frame. Therefore, the following paragraphs mainly introduce the configuration of how the adapter is fixed on the bicycle frame, and structures of other components and the relative positions and connections among these components can refer to the above paragraphs corresponding to the bicycle rear derailleur 100 with reference to FIG. 1 to FIG. 6, and thus will not be repeatedly introduced.

Figure 9:
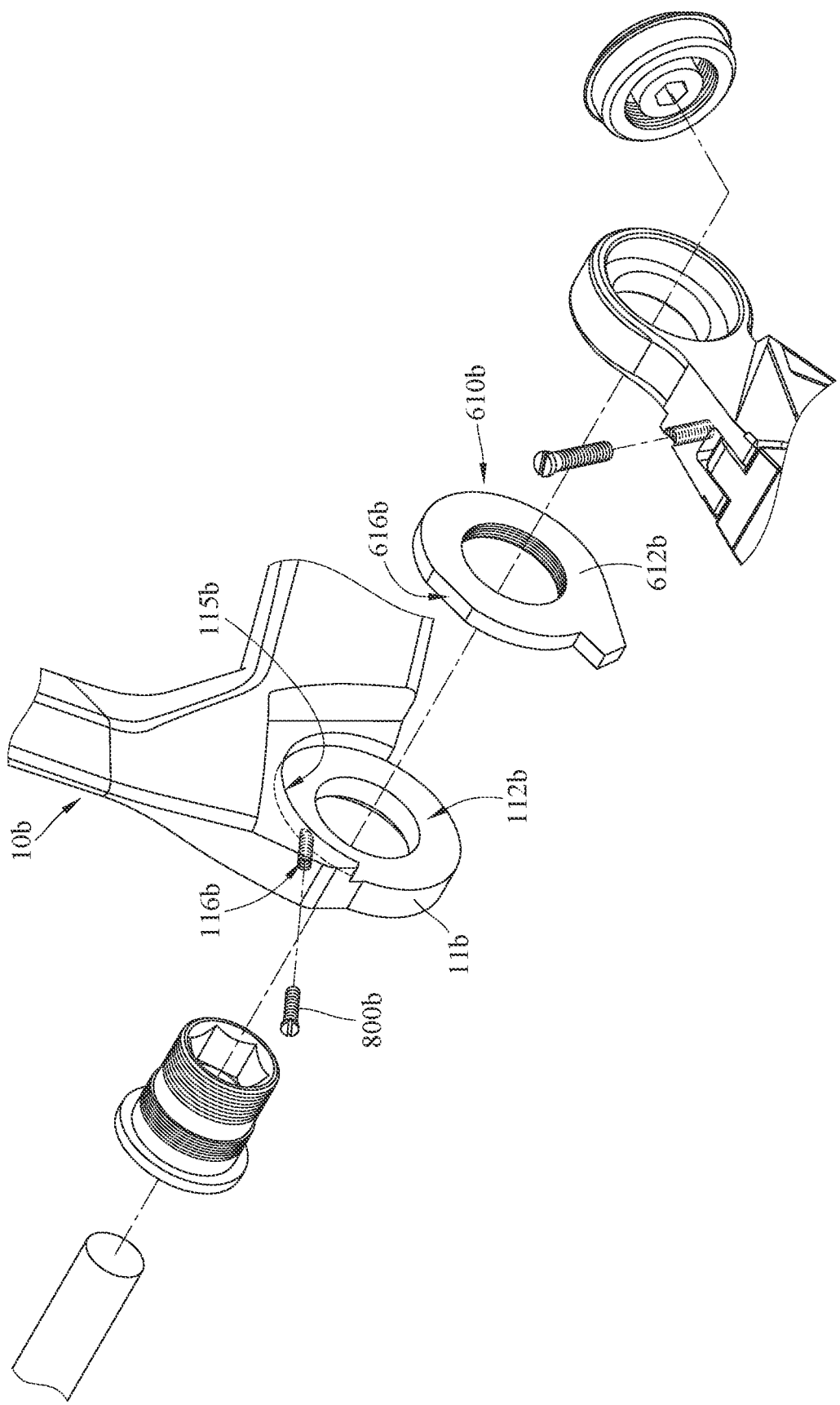
FIG. 9 is a partially exploded view of a bicycle rear derailleur in accordance with the third embodiment of the disclosure, a bicycle frame, and a wheel shaft.
Figure 10:
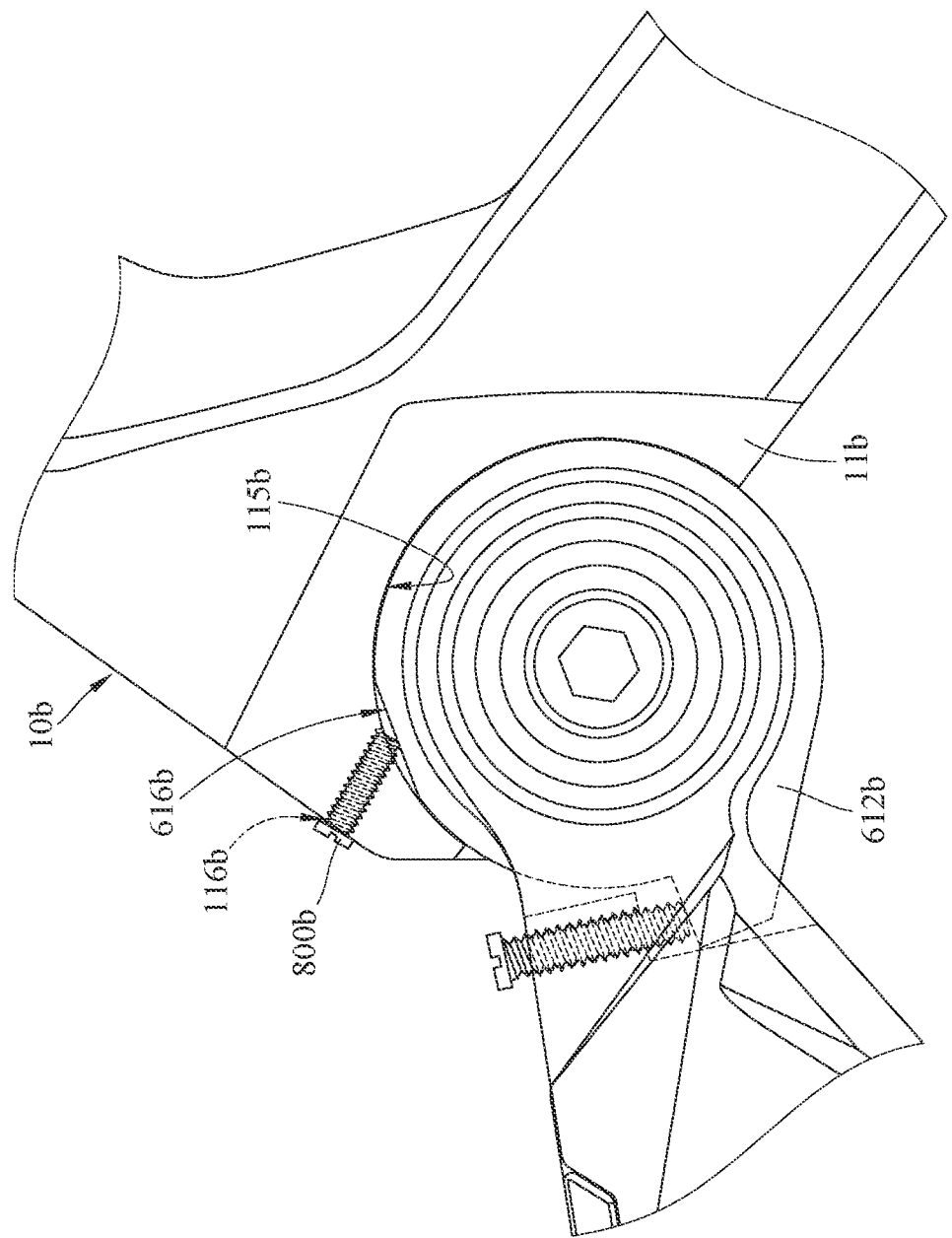
FIG. 10 is a side view of the bicycle rear derailleur, the bicycle frame and the wheel shaft in FIG. 9.

Refer to FIG. 9 and FIG. 10, where FIG. 9 is a partially exploded view of a bicycle rear derailleur in accordance with the third embodiment of the disclosure, a bicycle frame, and a wheel shaft, and FIG. 10 is a side view of the bicycle rear derailleur, the bicycle frame and the wheel shaft in FIG. 9.

In this embodiment, the bicycle rear derailleur further includes a positioning component 800b. The positioning component 800b is, for example, a screw. A plate portion 612b of an adapter 610b has a flat stop surface 616b. A mount portion 11b of a bicycle frame 10b has a surface 115b and a screw hole 116b. The surface 115b is connected to an outer surface 112b of the mount portion 11b, and the surface 115b is, for example, perpendicular to the outer surface 112b of the mount portion 11b. An end of the screw hole 116b is located at the surface 115b, and the other end of the screw hole 116b is exposed to the outside. The plate portion 612b of the adapter 610b is configured to be stacked on the outer surface 112b of the mount portion 11b of the bicycle frame 10b, and the screw hole 116b corresponds to the flat stop surface 616b of the plate portion 612b of the adapter 610b. The positioning component 800b is configured to be mounted on the screw hole 116b of the mount portion 11b of the bicycle frame 10b, and an end of the positioning component 800b is disposed through the screw hole 116b and contacts the flat stop surface 616b of the adapter 610b. In this way, with the cooperation of the positioning component 800b and the flat stop surface 616b of the adapter 610b, the positioning component 800b may fix the adapter 610b to the bicycle frame 10b so that the adapter 610b cannot rotate relative to the bicycle frame 10b.

Figure 11:
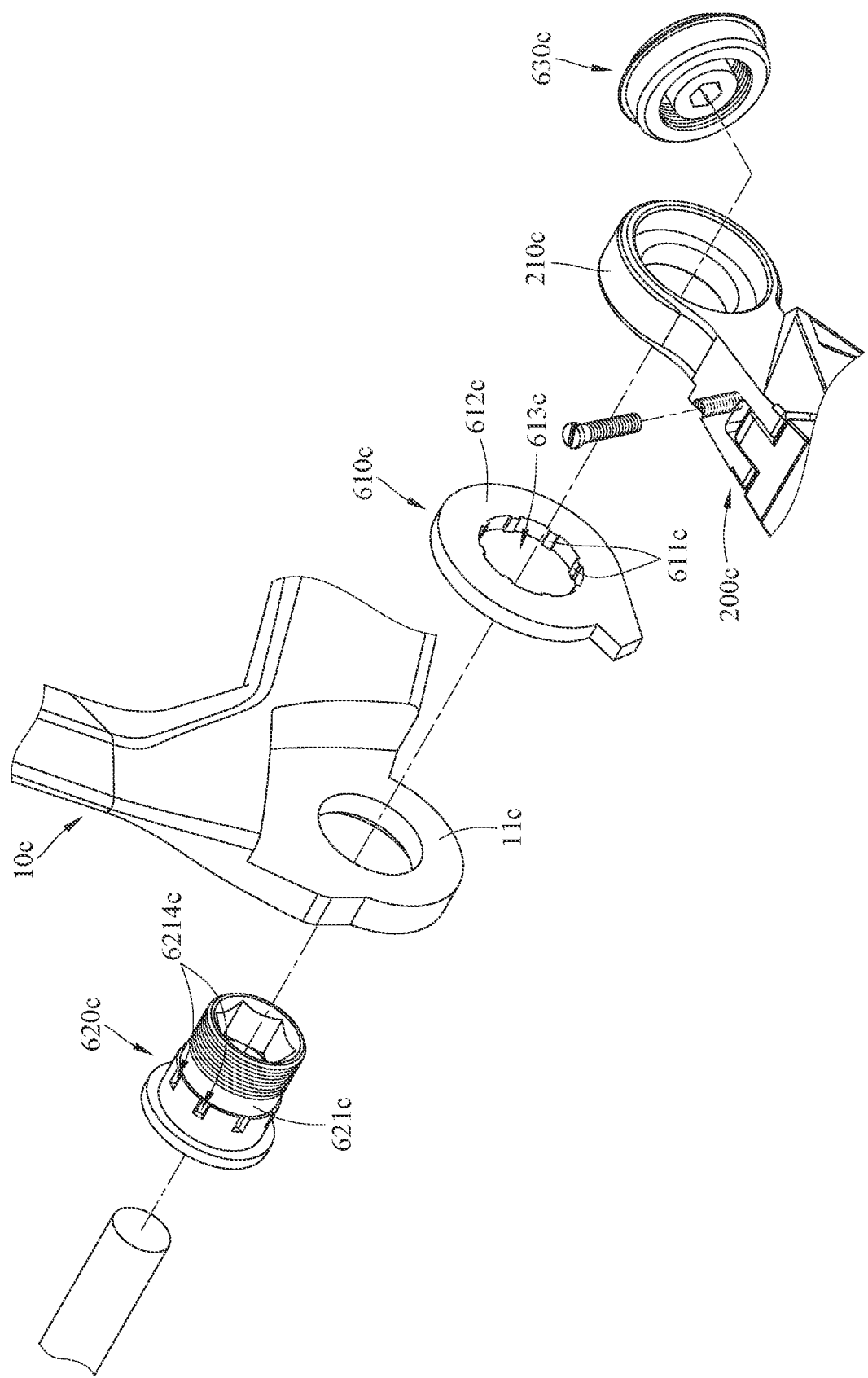
FIG. 11 is a partially exploded view of a bicycle rear derailleur in accordance with the fourth embodiment of the disclosure, a bicycle frame, and a wheel shaft.
Figure 12:
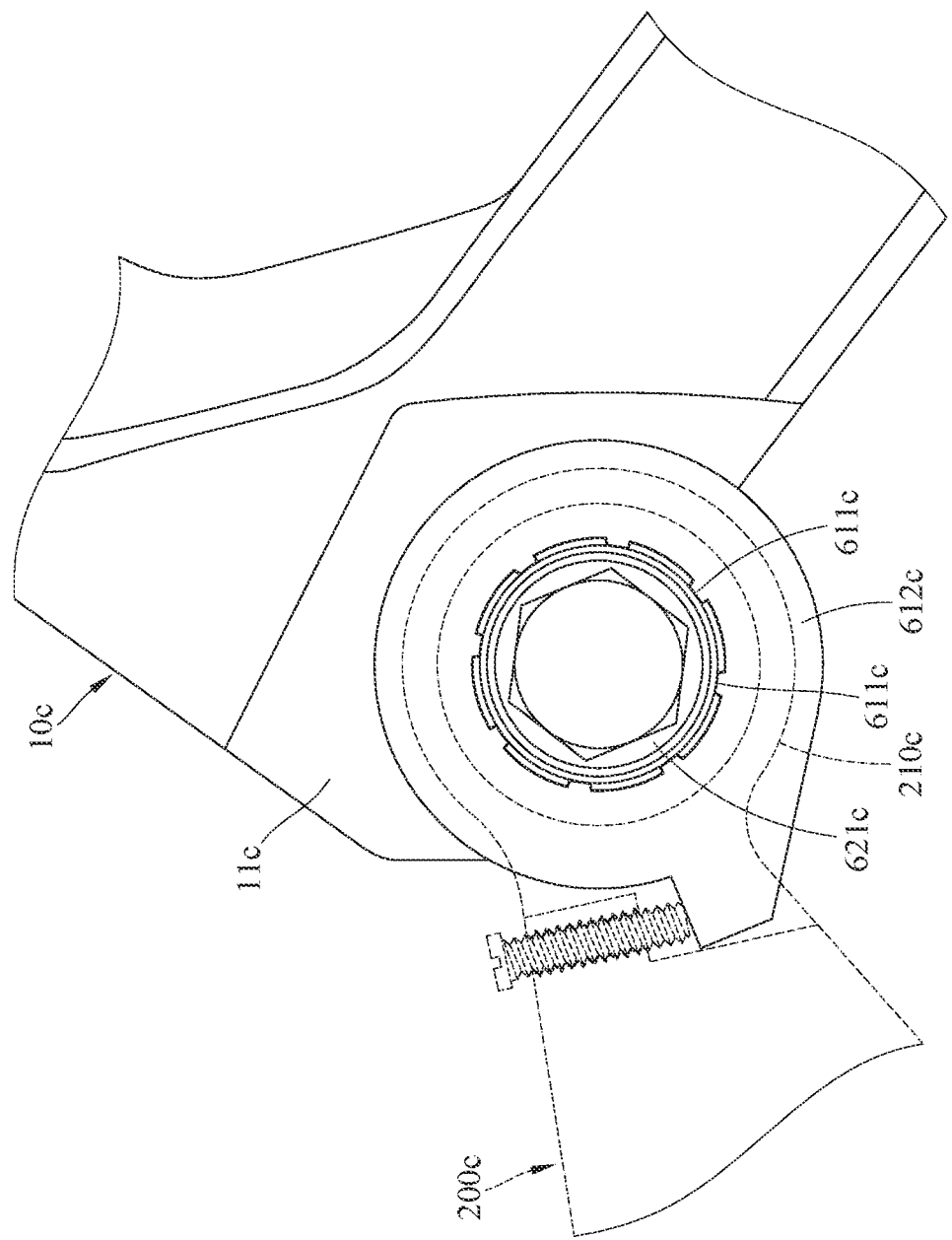
FIG. 12 is a side view of the bicycle rear derailleur, the bicycle frame and the wheel shaft in FIG. 11 when a fastener is omitted.

Referring to FIG. 11 and FIG. 12, where FIG. 11 is a partially exploded view of a bicycle rear derailleur in accordance with the fourth embodiment of the disclosure, a bicycle frame, and a wheel shaft, and FIG. 12 is a side view of the bicycle rear derailleur, the bicycle frame and the wheel shaft in FIG. 11 when a fastener is omitted.

In this embodiment, an adapter 610c has a plurality of positioning protrusion 611c. The positioning protrusions 611c protrude from an inner surface of a through hole 613c of a plate portion 612c of the adapter 610c. A pillar portion 621c of a bushing 620c has a plurality of positioning recesses 6214c. The positioning protrusions 611c of the adapter 610c are respectively engaged with the positioning recesses 6214c of the pillar portion 621c of the bushing 620c. In the case that the bushing 620c, a mount portion 11c of a bicycle frame 10c, the adapter 610c, a mount portion 210c of a base component 200c and a fastener 630c tightly contact one another, the bushing 620c and the adapter 610c can be fixed on the bicycle frame 10c, and the cooperation of the positioning recesses 6214c and the positioning protrusions 611c being engaged with the positioning recesses 6214c can further ensure that the adapter 610c cannot be rotated relative to the bicycle frame 10c so as to be fixed on the bicycle frame 10c.

Figure 13:
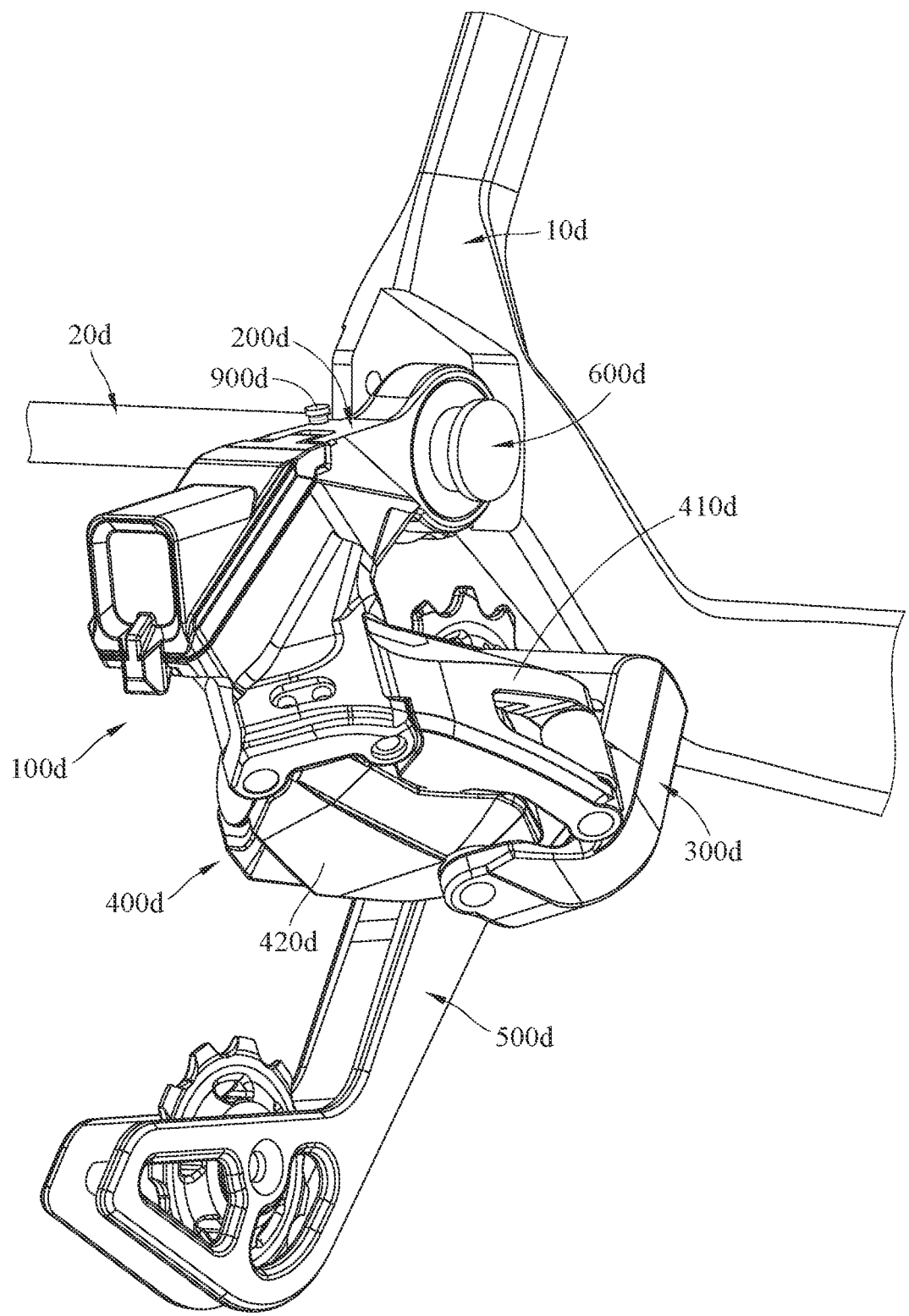
FIG. 13 is a perspective view of a bicycle rear derailleur in accordance with the fifth embodiment of the disclosure, a bicycle frame, and a wheel shaft.
Figure 14:
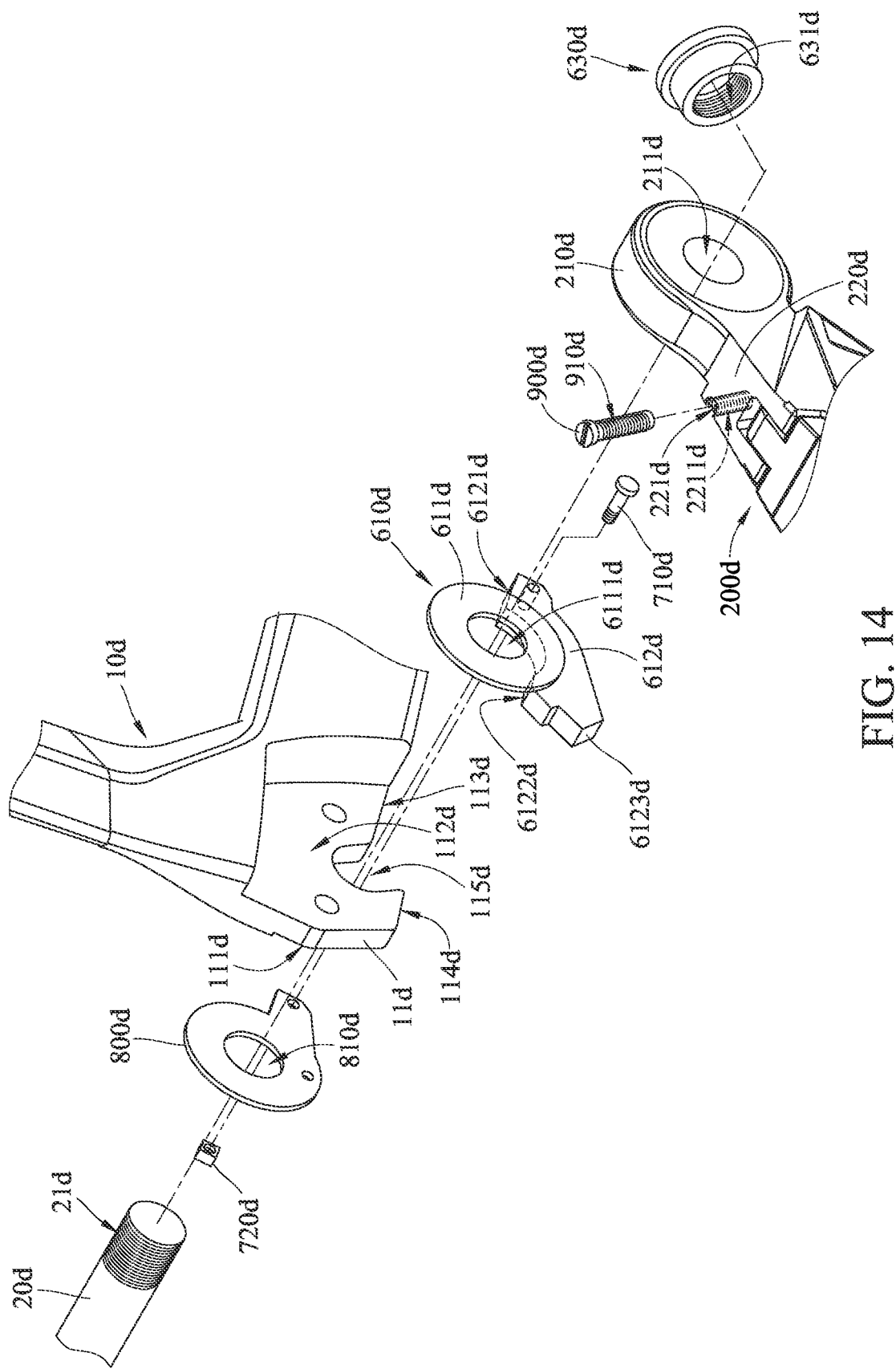
FIG. 14 is a partially exploded view of the bicycle rear derailleur, the bicycle frame and the wheel shaft in FIG. 13.
Figure 15:
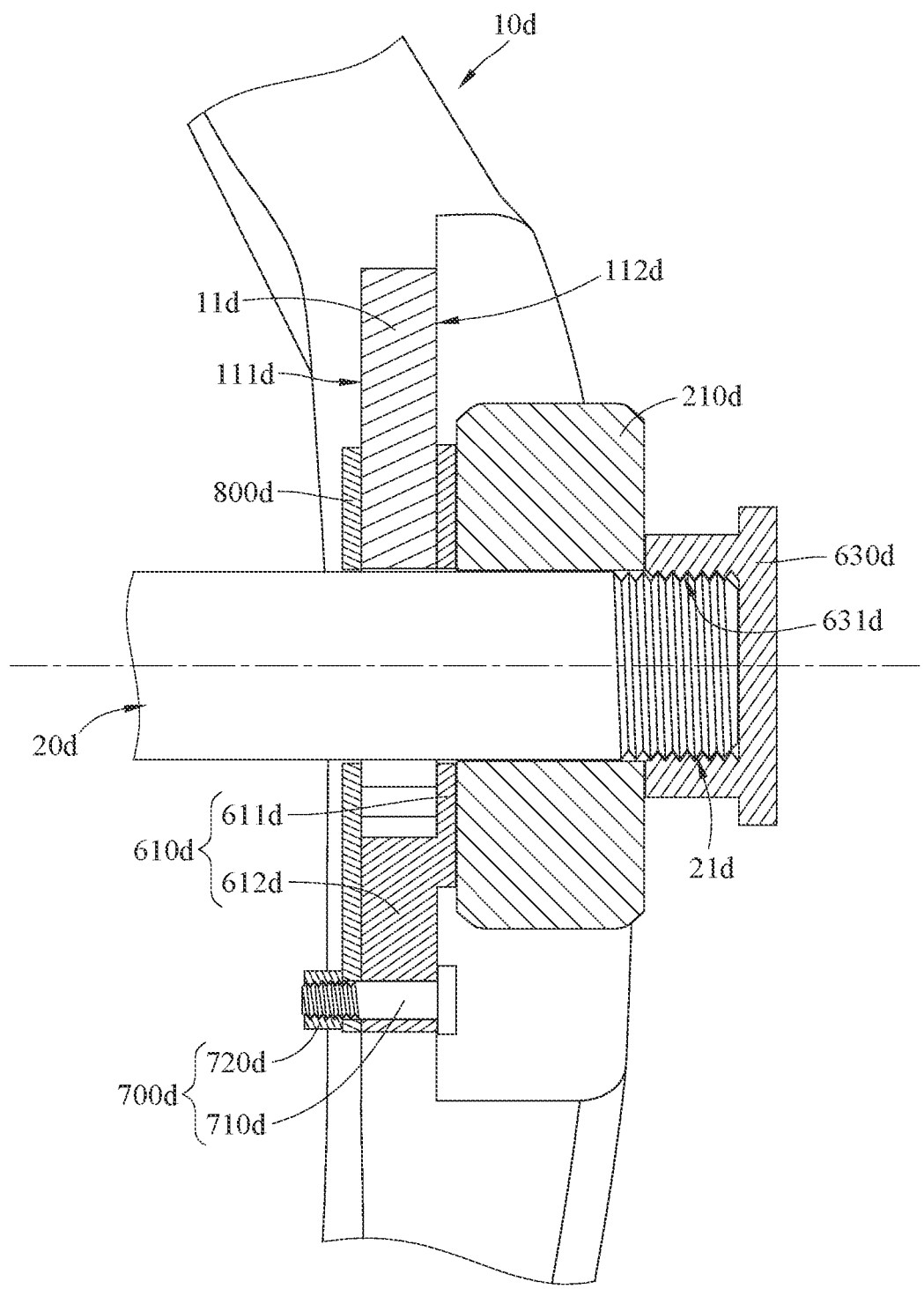
FIG. 15 is a partially cross-sectional view of the bicycle rear derailleur, the bicycle frame and the wheel shaft in FIG. 13.
Figure 16:
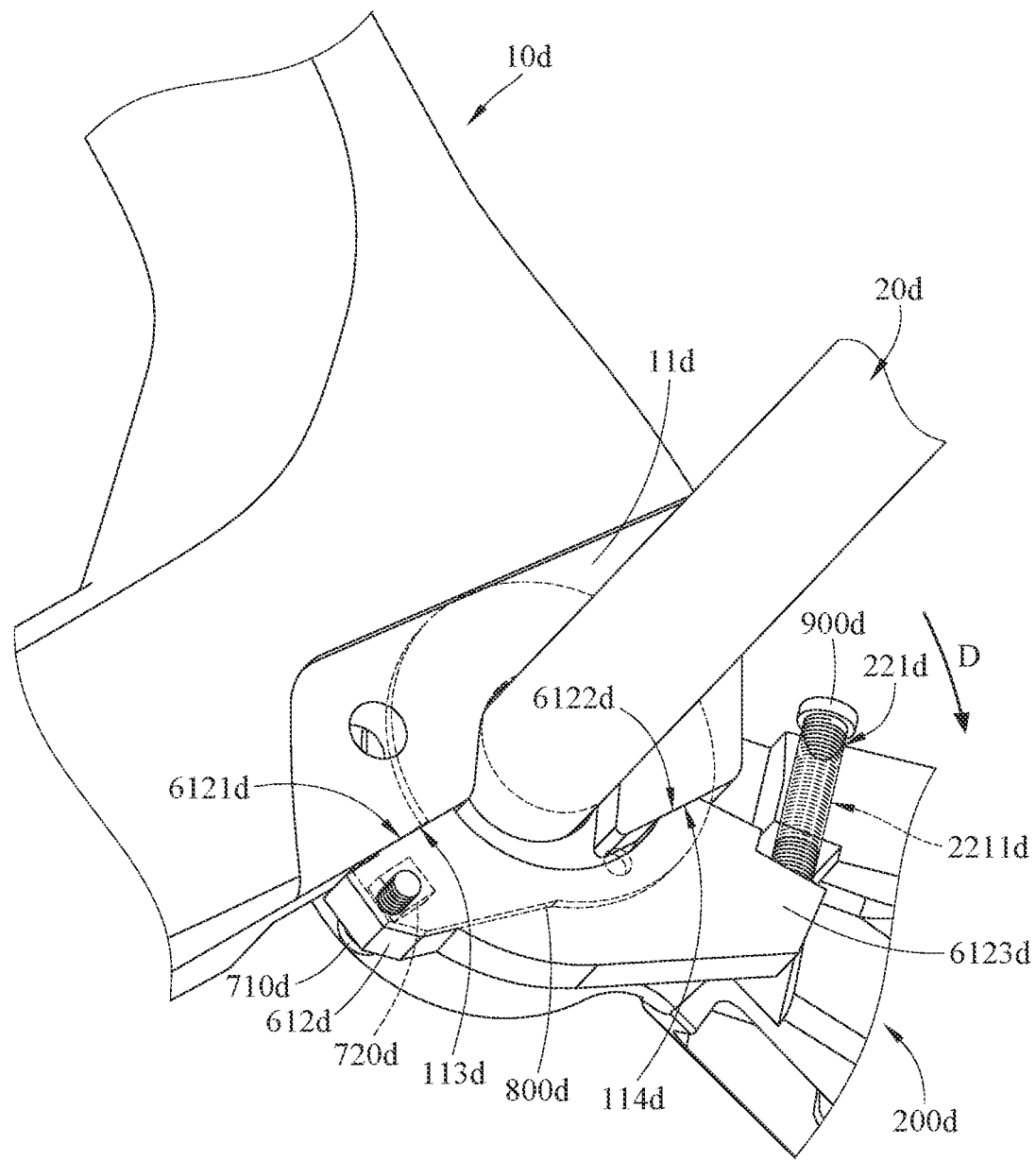
FIG. 16 is a partially perspective view of the bicycle rear derailleur, the bicycle frame and the wheel shaft in FIG. 13.

Referring to FIG. 13 to FIG. 16, where FIG. 13 is a perspective view of a bicycle rear derailleur 100d in accordance with the fifth embodiment of the disclosure, a bicycle frame 10d, and a wheel shaft 20d, FIG. 14 is a partially exploded view of the bicycle rear derailleur 100d, the bicycle frame 10d and the wheel shaft 20d in FIG. 13, FIG. 15 is a partially cross-sectional view of the bicycle rear derailleur 100d, the bicycle frame 10d and the wheel shaft 20d in FIG. 13, and FIG. 16 is a partially perspective view of the bicycle rear derailleur 100d, the bicycle frame 10d and the wheel shaft 20d in FIG. 13.

In this embodiment, the bicycle rear derailleur 100d is mounted on the wheel shaft 20d on the bicycle frame 10d. The bicycle frame 10d has a mount portion 11d. The mount portion 11d has an inner surface 111d, an outer surface 112d, a first button surface 113d, a second button surface 114d and a through hole 115d. The inner surface 111d of the mount portion 11d is configured to face a rear cassette assembly (not shown). The outer surface 112d faces away from the inner surface 111d. Both the first button surface 113d and the second button surface 114d are connected to the inner surface 111d and the outer surface 112d. The through hole 115d extends from the outer surface 112d to the inner surface 111d, and the first button surface 113d and the second button surface 114d are separated from each other through the through hole 115d. The through hole 115d is configured for a penetration of the wheel shaft 20d.

The bicycle rear derailleur 100d includes a base component 200d, a movable component 300d, a linkage assembly 400d, a chain guide 500d and a mount assembly 600d.

The linkage assembly 400d includes a first link 410d and a second link 420d. Two opposite ends of the first link 410d are pivotally disposed on the base component 200d and the movable component 300d respectively, and two opposite ends of the second link 420d are pivotally disposed on the base component 200d and the movable component 300d respectively. Accordingly, the base component 200d, the movable component 300d, the first link 410d, and the second link 420d together form a four-link mechanism. The chain guide 500d is pivotally disposed on the movable component 300d. The four-link mechanism is configured to move the chain guide 500d relative to the bicycle frame 10d so that a bicycle chain can be moved among sprockets of the rear cassette assembly which are different in size.

The mount assembly 600d includes an adapter 610d and a fastener 630d. The adapter 610d is configured to be fixed on the bicycle frame 10d and is partially clamped between the mount portion 11d of the bicycle frame 10d and the base component 200d. The mount portion 11d of the bicycle frame 10d, the base component 200d and the adapter 610d which is clamped between the bicycle frame 10d and the base component 200d are configured for a penetration of the wheel shaft 20d. The fastener 630d is configured to be fastened on the wheel shaft 20d and in contact with the base component 200d. The following paragraphs will further introduce the connections among the bicycle frame 10d, the adapter 610d of the mount assembly 600d, the fastener 630d and the base component 200d in detail.

The adapter 610d includes a first mount portion 611d and a second mount portion 612d. The first mount portion 611d is configured to be stacked on the outer surface 112d of the mount portion 11d of the bicycle frame 10d. The first mount portion 611d has a through hole 6111d. The through hole 6111d is configured for a penetration of the wheel shaft 20d. The second mount portion 612d has a first stop surface 6121d and a second stop surface 6122d separated from each other. The first stop surface 6121d and the second stop surface 6122d of the second mount portion 612d are configured to be in contact with the bicycle frame 10d to limit the rotation of the adapter 610d in two opposite directions.

In this embodiment, the bicycle rear derailleur 100d further includes a coupling component 700d and a mount plate 800d. The mount plate 800d is stacked on the inner surface 111d of the mount portion 11d of the bicycle frame 10d, and is also stacked on the second mount portion 612d. The mount plate 800d has a through hole 810d. The through hole 810d is configured for a penetration of the wheel shaft 20d. The coupling component 700d includes a screw 710d and a nut 720d. The screw 710d is disposed through the second mount portion 612d of the adapter 610d and the mount plate 800d. The nut 720d is screwed with the part of the screw 710d disposed through the second mount portion 612d of the adapter 610d and the mount plate 800d. Accordingly, the second mount portion 612d of the adapter 610d and the mount plate 800d are clamped between a part of the screw 710d and the nut 720d so that the adapter 610d and the mount plate 800d are fixed on the mount portion of the bicycle frame 10d.

The base component 200d has a mount portion 210d and a seat 220d connected to the mount portion 210d. The mount portion 210d has a through hole 211d. The through hole 211d of the mount portion 210d of the base component 200d is configured for a penetration of the wheel shaft 20d. The mount portion 210d of the base component 200d is stacked on the surface of the first mount portion 611d of the adapter 610d facing away from the mount portion 11d of the bicycle frame 10d. The first mount portion 611d of the adapter 610d is clamped between the mount portion 11d of the bicycle frame 10d and the mount portion 210d of the base component 200d.

The wheel shaft 20d has an outer threaded structure 21d located at an end of the wheel shaft 20d disposed through the through hole 211d of the mount portion 210d of the base component 200d. The fastener 630d has an inner threaded structure 631d. The inner threaded structure 631d of the fastener 630d is screwed with the outer threaded structure 21d of the wheel shaft 20d. The fastener 630d contacts the surface of the mount portion 210d of the base component 200d facing away from the first mount portion 611d of the adapter 610d so that the mount portion 210d of the base component 200d is clamped between the first mount portion 611d of the adapter 610d and the fastener 630d.

In this embodiment, the bicycle frame 10d, the base component 200d and the adapter 610d which is clamped between the bicycle frame 10d and the base component 200d are configured for a penetration of the wheel shaft 20d, and the fastener 630d is fastened on the wheel shaft 20d and contacts the base component 200d. Accordingly, the bicycle rear derailleur 100d and the wheel shaft 20d are coaxially disposed on the bicycle frame 10d. Therefore, the stability of the bicycle rear derailleur 100d can be improved so as to enable the bicycle rear derailleur 100d to resist an impact or a shock.

In addition, the first mount portion 611d of the adapter 610d, the mount portion 210d of the base component 200d and the fastener 630d are located at a side of the mount portion 11d of the bicycle frame 10d where the outer surface 112d faces, which facilitates the space located at an inner side of the bicycle frame 10d (e.g., the side of the mount portion 11d where the outer surface 112d faces) to be utilized for accommodating other components (e.g., the rear cassette assembly). Furthermore, with the aforementioned configuration, the bicycle rear derailleur 100d can be dissembled from the bicycle frame 10d after the faster 630d is removed from the wheel shaft 20d. Therefore, during the removal of the bicycle rear derailleur 100d from the bicycle frame 10d, there is no need to remove the wheel shaft 20d from the bicycle frame 10d, such that it is convenient to remove of the bicycle rear derailleur 100d. Similarly, the aforementioned configuration also facilitates the installation of the bicycle rear derailleur 100d.

In this embodiment, the base component 200d is pivotable relative to the adapter 610d via the wheel shaft 20d. The bicycle rear derailleur 100d further includes an adjustment component 900d, and the second mount portion 612d of the adapter 610d has a contact protrusion 6123d. The adjustment component 900d is rotatably disposed through the seat 220d of the base component 200d and contacts the contact protrusion 6123d. In detail, the seat 220d of the base component 200d has a screw hole 221d. The screw hole 221d has an inner threaded structure 2211d. The adjustment component 900d has an outer threaded structure 910d. The outer threaded structure 910d of the adjustment component 900d is screwed with the inner threaded structure 2211d of the screw hole 221d, and a side of the adjustment component 900d protrudes from the screw hole 221d and contact the contact protrusion 6123d of the second mount portion 612d of the adapter 610d.

When the bicycle rear derailleur 100d is mounted on the bicycle frame 10d and the bicycle chain is hung on the chain guide 500d, the tension of the bicycle chain may exert on the entire bicycle rear derailleur 100d along a pivoting direction D, and forces an end of the adjustment component 900d to keep contacting the contact protrusion 6123d of the second mount portion 612d of the adapter 610d.

In this embodiment, the adjustment component 900d can be rotated relative to the base component 200d for driving the base component 200d to pivot relative to the adapter 610d. In detail, since the adapter 610d is fixed on the mount portion 11d of the bicycle frame 10d, and an end of the adjustment component 900d keeps contacting the contact protrusion 6123d of the second mount portion 612d of the adapter 610d, rotating the adjustment component 900d clockwise or counterclockwise enables the base component 200d to pivot in the direction D or a direction opposite to the direction D via the cooperation of the inner threaded structure 2211d of the screw hole 221d of the seat 220d of the base component 200d and the outer threaded structure 910d of the adjustment component 900d, and shortens or increases the length of the adjustment component 900d sticking out of the screw hole 221d. By doing so, the movable component 300d, the linkage assembly 400d and the chain guide 500d can be pivoted along with the base component 200d in the direction D or the direction opposite to the direction D so as to adjust the positions of these components relative to the bicycle frame 10d.

According to the bicycle rear derailleur as described above, the bushing is configured to be disposed through the bicycle frame, the adapter and the base component and is configured for the insertion of the wheel shaft, and the fastener is fastened on the bushing. Alternatively, the bicycle frame, the base component and the adapter which is clamped between the bicycle frame and the base component are configured for a penetration of the wheel shaft, and the fastener is fastened on the wheel shaft and contacts the base component. Accordingly, the bicycle rear derailleur and the wheel shaft are coaxially disposed on the bicycle frame. Therefore, the stability of the bicycle rear derailleur can be improved so as to enable the bicycle rear derailleur to resist an impact or a shock.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle rear derailleur, configured to be mounted on a wheel shaft on a bicycle frame, comprising:
    a base component, configured to be mounted on the bicycle frame;
    a movable component;
    a linkage assembly, wherein two opposite ends of the linkage assembly are pivotally disposed on the base component and the movable component respectively;
    a chain guide, pivotally disposed on the movable component; and
    a mount assembly, comprising an adapter, a bushing, and a fastener, wherein the adapter is configured to be fixed on the bicycle frame, the base component is stacked on the adapter, the bushing is configured to be disposed through the bicycle frame, the adapter and the base component, and the bushing is configured for an insertion of the wheel shaft, and the fastener is fastened on the bushing.

2. The bicycle rear derailleur according to claim 1, wherein at least part of the adapter is located between a part of the bicycle frame and the fastener.

3. The bicycle rear derailleur according to claim 1, wherein a part of the bicycle frame is located between a part of the bushing and a part of the base component.

4. The bicycle rear derailleur according to claim 1, wherein a part of the bicycle frame is located between a part of the bushing and at least part of the adapter.

5. The bicycle rear derailleur according to claim 1, wherein the base component is pivotable relative to the adapter via the bushing.

6. The bicycle rear derailleur according to claim 5, further comprising an adjustment component, wherein the adapter has a contact protrusion, wherein the adjustment component is rotatably disposed through the base component and in contact with the contact protrusion, and the adjustment component is rotatable relative to the base component to drive the base component to pivot relative to the adapter.

7. The bicycle rear derailleur according to claim 6, wherein the base component has a screw hole having an inner threaded structure, and the adjustment component has an outer threaded structure, and the outer threaded structure of the adjustment component is screwed with the inner threaded structure of the screw hole.

8. The bicycle rear derailleur according to claim 1, wherein the adapter has a positioning protrusion extending in a direction parallel to an axis of the bushing, and the positioning protrusion is configured to be inserted into a positioning recess of the bicycle frame.

9. The bicycle rear derailleur according to claim 1, wherein the adapter has a positioning protrusion, which extending in a direction perpendicular to an axis of the bushing, and positioning protrusion is configured to be engaged with a positioning recess of the bicycle frame.

10. The bicycle rear derailleur according to claim 1, wherein the adapter has a through hole and a positioning protrusion, the positioning protrusion protrudes from an inner surface of the through hole, the bushing has a positioning recess, the bushing is disposed through the through hole of the adapter, and the positioning protrusion of the adapter is engaged with the positioning recess of the bushing.

11. The bicycle rear derailleur according to claim 1, further comprising a positioning component, the adapter has a flat stop surface, and the positioning component is configured to be disposed through the bicycle frame and in contact with the flat stop surface.

12. A bicycle rear derailleur, configured to be mounted on a wheel shaft on a bicycle frame, comprising:
    a base component, configured to be mounted on the bicycle frame;
    a movable component;
    a linkage assembly, wherein two opposite ends of the linkage assembly are pivotally disposed on the base component and the movable component respectively;

a chain guide, pivotally disposed on the movable component; and a mount assembly, comprising an adapter and a fastener, wherein the adapter is configured to be fixed on the bicycle frame and partially clamped between the bicycle frame and the base component, wherein the bicycle frame, the base component and the adapter which is clamped between the bicycle frame and the base component, are configured for a penetration of the wheel shaft, and the fastener is configured to be fastened on the wheel shaft and in contact with the base component;

wherein an entire mount portion of the base component is located between a part of the adapter and the fastener.

13. The bicycle rear derailleur according to claim 12, wherein the base component is rotatable relative to the adapter via the wheel shaft.

14. The bicycle rear derailleur according to claim 13, further comprising an adjustment component, wherein the adapter has a contact protrusion, wherein the adjustment component is rotatably disposed through the base component and in contact with the contact protrusion, and the adjustment component is rotatable relative to the base component to drive the base component to pivot relative to the adapter.

15. The bicycle rear derailleur according to claim 14, wherein the base component has a screw hole, which has an inner threaded structure, and the adjustment component has an outer threaded structure, and the outer threaded structure of the adjustment component is screwed with the inner threaded structure of the screw hole.

16. The bicycle rear derailleur according to claim 12, wherein the adapter has a first stop surface and a second stop surface separated from each other, the first stop surface and the second stop surface are configured to be in contact with the bicycle frame to limit a rotation of the adapter in two opposite directions.

17. A bicycle rear derailleur, configured to be mounted on a wheel shaft on a bicycle frame, comprising:
  a base component, configured to be mounted on the bicycle frame;
  a movable component;
  a linkage assembly, wherein two opposite ends of the linkage assembly are pivotally disposed on the base component and the movable component respectively;
  a chain guide, pivotally disposed on the movable component;
  a mount assembly, comprising an adapter and a fastener, wherein the adapter is configured to be fixed on the bicycle frame and partially clamped between the bicycle frame and the base component, wherein the bicycle frame, the base component and the adapter which is clamped between the bicycle frame and the base component, are configured for a penetration of the wheel shaft, and the fastener is configured to be fastened on the wheel shaft and in contact with the base component; and
  a coupling component and a mount plate, wherein the bicycle frame is clamped between a part of the adapter and the mount plate, another part of the adapter is stacked on the mount plate, and the adapter is fixed on the mount plate via the coupling component.

18. The bicycle rear derailleur according to claim 17, wherein the coupling component comprises a screw and a nut, the screw is disposed through the adapter and the mount plate, the nut is screwed with the screw, and the adapter and the mount plate are clamped between a part of the screw and the nut.

* * * * *